United States Patent
Oh et al.

(10) Patent No.: US 7,742,652 B2
(45) Date of Patent: Jun. 22, 2010

(54) METHODS AND SYSTEMS FOR IMAGE NOISE PROCESSING

(75) Inventors: Byung Tae Oh, Los Angeles, CA (US);
Shijun Sun, Redmond, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 850 days.

(21) Appl. No.: 11/614,924

(22) Filed: Dec. 21, 2006

(65) Prior Publication Data

US 2008/0152247 A1    Jun. 26, 2008

(51) Int. Cl.
*G06K 9/36* (2006.01)
(52) U.S. Cl. ............... 382/260; 382/274; 382/275; 358/3.26; 358/3.27
(58) Field of Classification Search ........ 382/260, 382/274, 275; 358/3.26, 3.27, 463
See application file for complete search history.

(56) References Cited

U.S. PATENT DOCUMENTS

| | | | | |
|---|---|---|---|---|
| 6,148,116 | A * | 11/2000 | Park et al. | 382/266 |
| 6,453,056 | B2 * | 9/2002 | Laumeyer et al. | 382/104 |
| 6,546,117 | B1 | 4/2003 | Sun et al. | |
| 6,743,020 | B2 * | 6/2004 | Pestl | 434/100 |
| 7,086,735 | B1 * | 8/2006 | Provitola | 353/10 |
| 7,102,669 | B2 * | 9/2006 | Skow | 348/222.1 |
| 2006/0083314 | A1 | 4/2006 | Cooper et al. | |
| 2006/0083316 | A1 | 4/2006 | Cooper et al. | |
| 2006/0083426 | A1 | 4/2006 | Cooper et al. | |
| 2006/0215767 | A1 | 9/2006 | Gomila et al. | |

FOREIGN PATENT DOCUMENTS

| | | |
|---|---|---|
| EP | 1551320 A1 | 2/2005 |
| JP | 1511319 A1 | 2/2005 |
| WO | WO2004027045 A1 | 3/2005 |
| WO | WO2004032143 A1 | 4/2005 |
| WO | WO2005034518 A1 | 4/2005 |

OTHER PUBLICATIONS

A. Buades, B. Coll, and J. M. Morel, "A review of image denoising algorithms, with a new one", Multiscale Model. Simul., 4, pp. 490-530. 2005.
C. Tomasi and R. Manduchi, "Bilateral Filtering for Gray and Color Images," Proc. IEEE, Computer Vision, pp. 839-846, Jan. 1998.
S. Mallat and S. Zhong, "Characterization of signals from multiscale edges", IEEE Trans. Pattern Anal. Machine Intell., vol. 14, pp. 710-732, Jul. 1992.
J. Canny, "A computational approach to edge detection", IEEE Trans. Pattern Anal. Machine Intell., 1986.
Zixiang Xiong, Orchard, M.T., Ya-Qin Zhang, "A deblocking algorithm for JPEG compressed images using overcomplete wavelet representations", IEEE Trans. Circuits and Systems for Video Technology, 1997.

* cited by examiner

*Primary Examiner*—Yosef Kassa
(74) *Attorney, Agent, or Firm*—Krieger Intellectual Property, Inc.; Scott C. Krieger

(57) ABSTRACT

Embodiments of the present invention comprise systems and methods for identifying and separating noise from an image.

20 Claims, 9 Drawing Sheets

METHODS AND SYSTEMS FOR IMAGE NOISE PROCESSING

FIELD OF THE INVENTION

Embodiments of the present invention comprise methods and systems for image noise processing.

BACKGROUND

Noise in digital images can comprise high-frequency elements that can add significantly to the size of a compressed image. Noise can also detract from the visual aspects of an image. However, many noise removal techniques can also remove high-frequency image elements such as edges thereby degrading the fine detail of the image. Noise removal methods that preserve image detail can increase image compression and other attributes while maintaining image quality.

SUMMARY

Some embodiments of the present invention comprise methods and systems for image noise identification and separation.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Many types of noise can be introduced into an image during image capture and processing. For example, film grain noise in motion pictures and still images is caused by a developing process wherein silver-halide crystals are dispersed in a photographic emulsion. This randomly distributed film grain noise and other types of noise can be an unbearable burden on typical video compression systems. When optimal compression is desired, it is important to remove, as much as possible, the noise to achieve higher coding gain.

However, some viewers find film grain noise to be an aesthetically pleasing element of an image. When noise is to be preserved for addition to the image at the decoder, the grain noise signals may be perceptually important on the decoder side. When actual noise patterns are to be preserved, the film grain signals can be extracted for noise modeling at the encoder so they can be reproduced and rendered on the decoder. Some embodiments of the present invention comprise systems and methods for removal and extraction of film grain noise and other noise while preserving image edges and textures.

Figure 1:
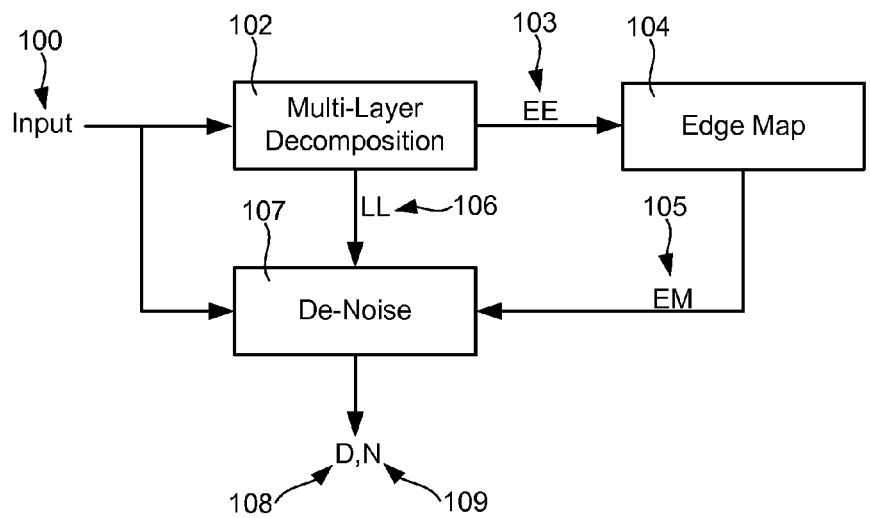
FIG. 1 is a diagram showing an exemplary embodiment of the present invention comprising multi-layer decomposition.

Some embodiments of the present inventions may be described with reference to FIG. 1. In these embodiments, an input image 100 is sent to a multi-layer decomposition process 102 wherein the input image 100 is filtered or transformed into multiple filtered or transformed images. These multiple filtered or transformed images may comprise an edge energy feature 103 and a smoothed or low-pass filtered image 106. In some embodiments, the multi-layer decomposition process 102 may result in several layers of energy features 103 and low-pass filtered image 106, as explained in more detail below.

One or more edge energy features may be converted to an edge map 105 by an edge map process 104. This process may comprise thresholding the edge energy feature 103. The edge map 105, smoothed or low-pass filtered images 106 and the original input image may then be input to a de-noise process 107 wherein the input image 100 is selectively modified with one or more smoothed or low-pass filtered images 106 in correlation with the edge map 105. Some embodiments of the de-noise process 107 are explained in more detail below. The result of the de-noise process 107 is a de-noised image 108. In some embodiments, a noise image 109 may also be produced from a de-noise process 107. In those embodiments, the noise image 109 may be combined with the original image or another image when noise effects are desirable.

Figure 2:
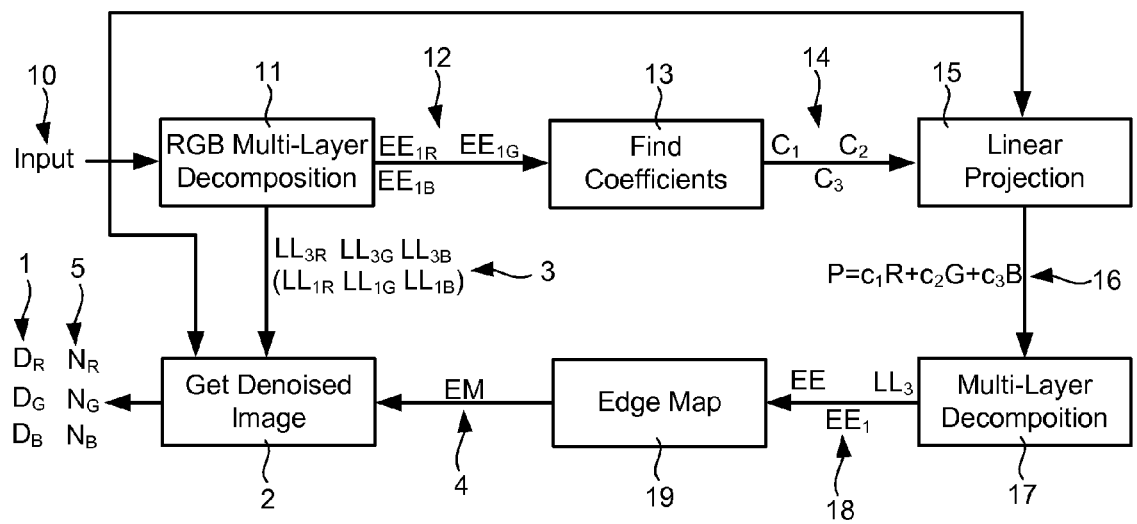
FIG. 2 is a diagram showing an exemplary embodiment of the present invention comprising multi-layer decomposition of color channels.

Some embodiments of the present invention may be described with reference to FIG. 2. In these embodiments, an input image 10 is typically in a format comprising multiple color channels, e.g., RG&B, but may be converted from another format in some embodiments. The input image 10 is sent to multiple processes comprising a multi-layer decomposition process 11, a linear projection process 15 and a de-noising process 2. The multi-layer decomposition process 1 may use one or more filters or transforms to create a series of filtered or transformed images from which an edge energy feature 12 and smoothed image elements 3 can be determined. Some embodiments of the multi-layer decomposition process are described in more detail below.

The edge energy feature data 12 may be sent to a coefficient generator 13, such as principle component analysis process. These coefficients 14 may then be combined with the original image in a linear projection process 15 to produce a combined edge energy image 16. The combined edge energy image 16 may then be decomposed through filtering and/or transformation 17 to generate a combined edge energy feature, one or more combined, smoothed images and other data 18. These features, images and data 18 may be used in an edge map process 19 to create an edge map 4. In some embodiments, this process 19 may comprise a thresholding process.

In some embodiments, a de-noising process 2 may receive an edge map 4, an input image 10 and smoothed image elements 3 to generate de-noised image elements 1 and noise image elements 5. In some embodiments, the de-noised image 1 may be compressed and transmitted with higher compression efficiency than the original input image 10. When desired, the noise image 5 may be re-combined with the de-noised image 1 when the visual effect of the noise is desired. In some embodiments, the de-noised image 1 may be modified after transmission to add any desirable effects of the removed noise.

Multi-Layer Decomposition

Some embodiments of the present invention comprise methods and systems for removing film grain noise while preserving edges of the original image. In order to preserve image edges and textures, edge areas may need to be identified. Embodiments may comprise many edge detection methods. In some embodiments, edges may be detected by using an overcomplete wavelet transform with 3-tap filters. In an exemplary embodiment, the filter coefficients are ¼[1 2 1] and ½[1 0 −1] for low- and high-pass filters, respectively. The symmetric (skew-symmetric) filter may be used to keep the phase information during the filtering process. In other embodiments, the filter size and its coefficients may vary.

Figure 3:
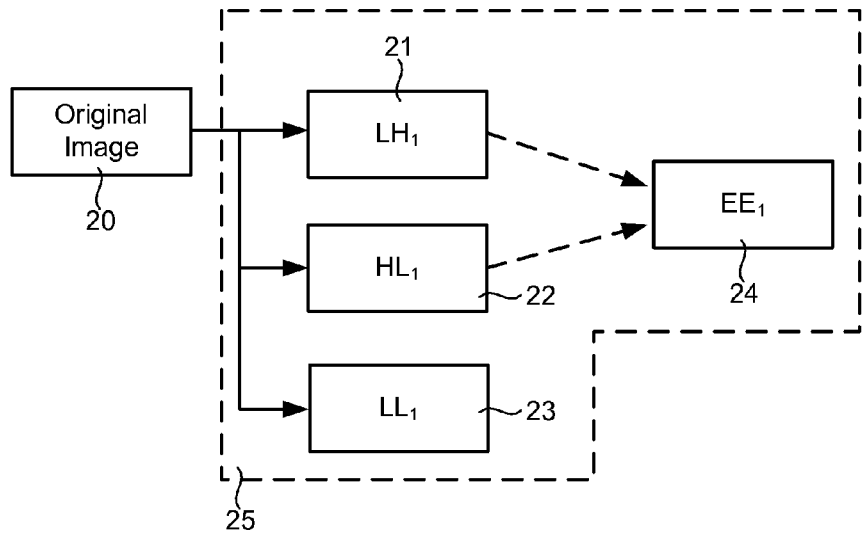
FIG. 3 is a diagram showing an exemplary embodiment of the present invention comprising first-layer filtering processes.

Aspects of some embodiments of the present invention may be described with reference to FIG. 3. In these embodiments, an original image 20 may be transformed to obtain subband outputs 21, 22, and 23. Each transform output corresponds to a filtering process wherein the original image 20 is filtered horizontally and vertically using a high-pass or low-pass filter depending on the subband. In an exemplary embodiment shown in FIG. 3, the original image 20 is low-pass filtered horizontally and high-pass filtered vertically to produce subband output $LH_1$ 21. The original image 20 is also high-pass filtered horizontally and the result is low-pass filtered vertically to produce subband output $HL_1$ 22. The horizontally-low-pass filtered image may also be low-pass filtered vertically to produce subband output $LL_1$ 23. In these embodiments, the LL subband 23 may represent a de-noised image, the LH subband 21 may represent a vertical edge signal and the HL subband 22 may represent a horizontal edge signal. In some embodiments, overcomplete transforms may be used. Some embodiments, unlike conventional wavelet transforms, do not decimate image resolution so that each subband has the same resolution as the input image 20.

In some embodiments, an edge energy feature may be obtained by conventional 1-norm measurement as shown in Equation 1 below.

$$EE_k(i,j)=|LH_k(i,j)|+|HL_k(i,j)| \qquad (1)$$

The edge energy feature is defined as EE for simplicity. And, i and j represent the horizontal and vertical positions of an image sample, respectively.

In other embodiments, other edge energy detection and calculation methods may be used to generate an edge energy feature. In the embodiments illustrated in FIG. 3, the edge energy feature 24 is calculated by adding the absolute values of LH and HL subband outputs 21 and 22. On the first transform iteration 25, which is performed on the original image 20 a first level edge energy feature 24 may be generated based on the subband outputs 21, 22, and 23 produced therein.

Figure 4:
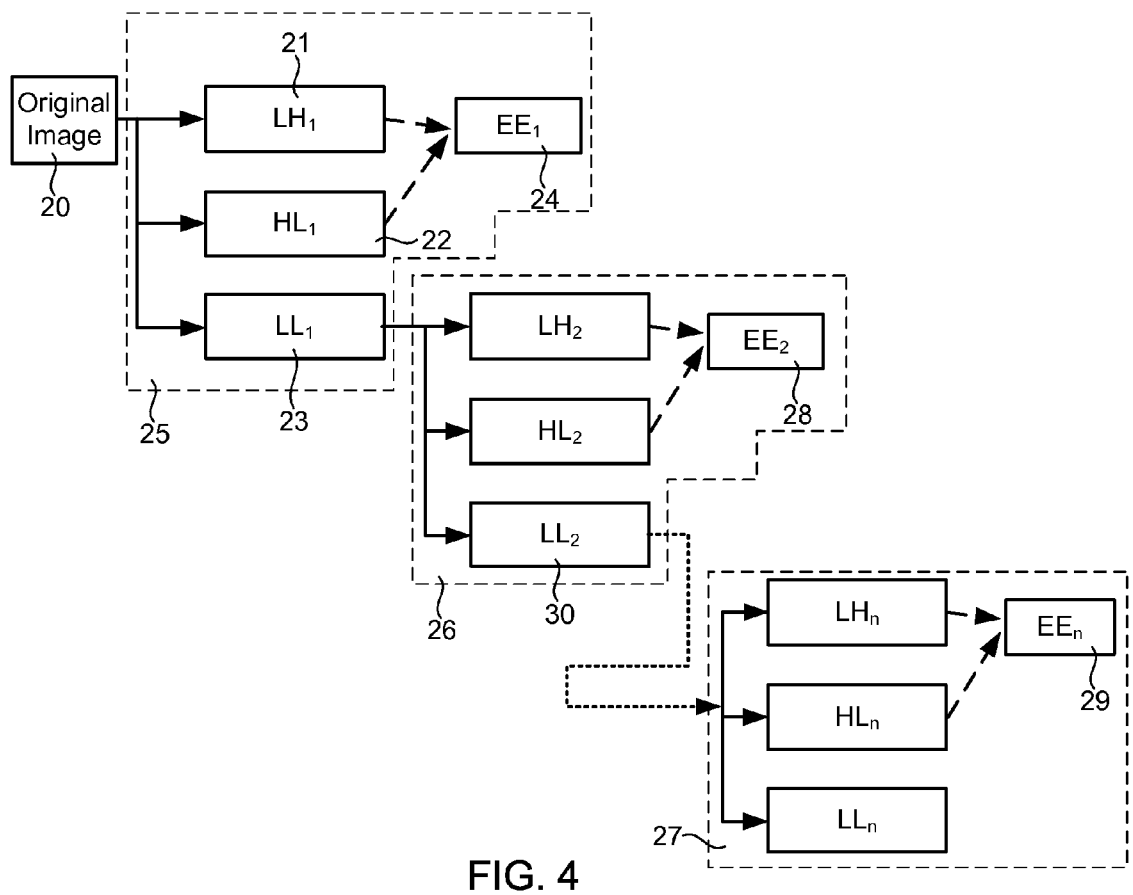
FIG. 4 is a diagram showing an exemplary embodiment of the present invention comprising multiple filtering or transform layers.

Since the intensity of some noises may be too strong to be eliminated by one filtering iteration, in some embodiments, the filtering or transform process may be repeated multiple times. In some embodiments, illustrated in FIG. 4, a multiple-iteration filtering or transform process may be used. In these embodiments, doubly-low-pass-filtered subband output 23 may be used as input to the next filtering process 26 and the LL subband output 30 from that process 26 may be used as input in a subsequent filtering process 27. In each filtering process 25, 26 and 27, an edge energy feature may be generated 24, 28 and 29. In some embodiments, this repeated approach gives better discriminating power. For these multiple-filtering-process embodiments, the subscript "k" in Eq. 1 refers to the number of layers, i.e. $EE_1$, $EE_2$, and so on.

Excessive decomposition may cause an extremely blurred image. It is, therefore, desirable to find a suitable or optimal number of decomposition levels for a particular type of image and application. In some embodiments, which are used in conjunction with HD resolution pictures, a four-level decomposition has been found to provide acceptable results. In some embodiments, adapted for resolutions higher than HD sequences (e.g., 4 k DC), the number of levels may be higher than 4; while for resolutions lower than HD sequences (e.g., SD), the number of levels may be lower than 4.

Although a higher-level edge energy feature has more discriminating power, the lower-level edge energy features may also include important information including fine texture information. A principle axis analysis was used to obtain the best linear combination of the coefficients. This analysis showed that each level of edge energy feature is almost equally important. Accordingly, in some embodiments, an image edge energy feature, EE can be derived as the average of all level's energy features, e.g., $EE_1$ to $EE_4$ for 4-level embodiments. However, in some embodiments, EE may be obtained by averaging some of the higher level features, e.g., $EE_3$ and $EE_4$ in 4-level embodiments. Equation 2 shows an exemplary edge energy feature calculation.

$$EE=\tfrac{1}{2}(EE_3+EE_4) \qquad (2)$$

Figure 5A:
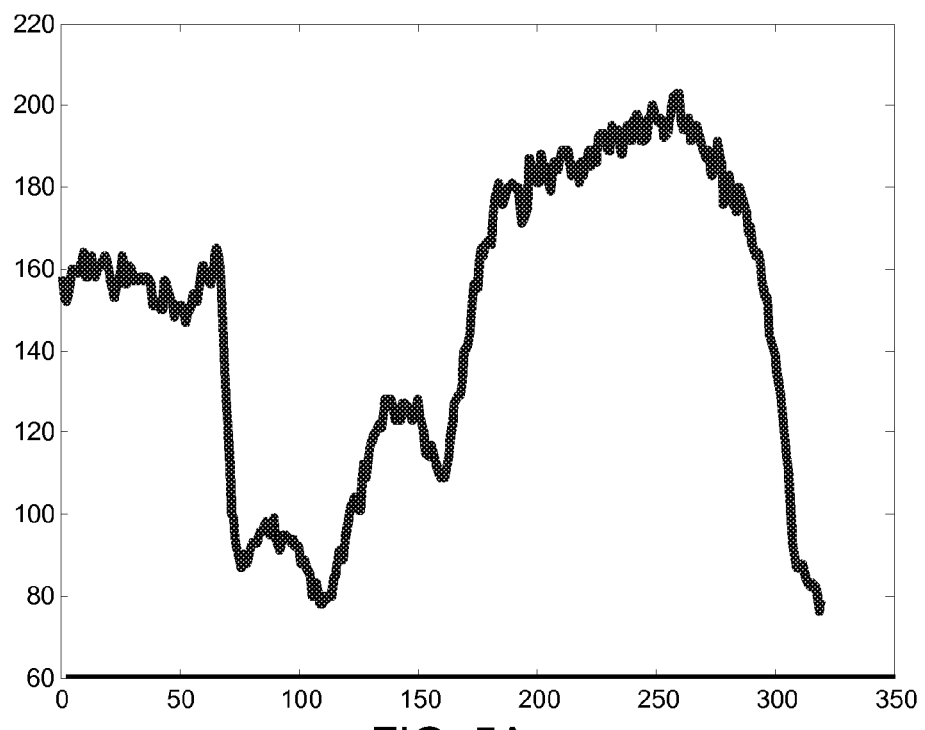
FIG. 5A is a graph showing an exemplary signal comprising typical edge characteristics.
Figure 5B:
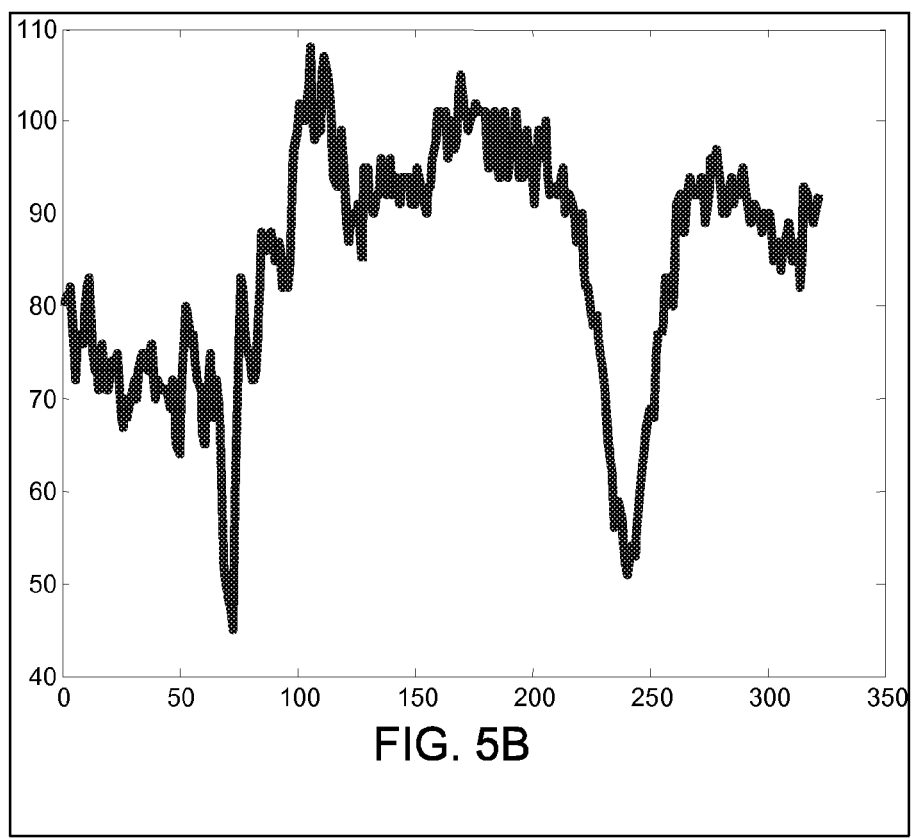
FIG. 5B is a graph showing an exemplary signal comprising typical fine detail characteristics.
Figure 6A:
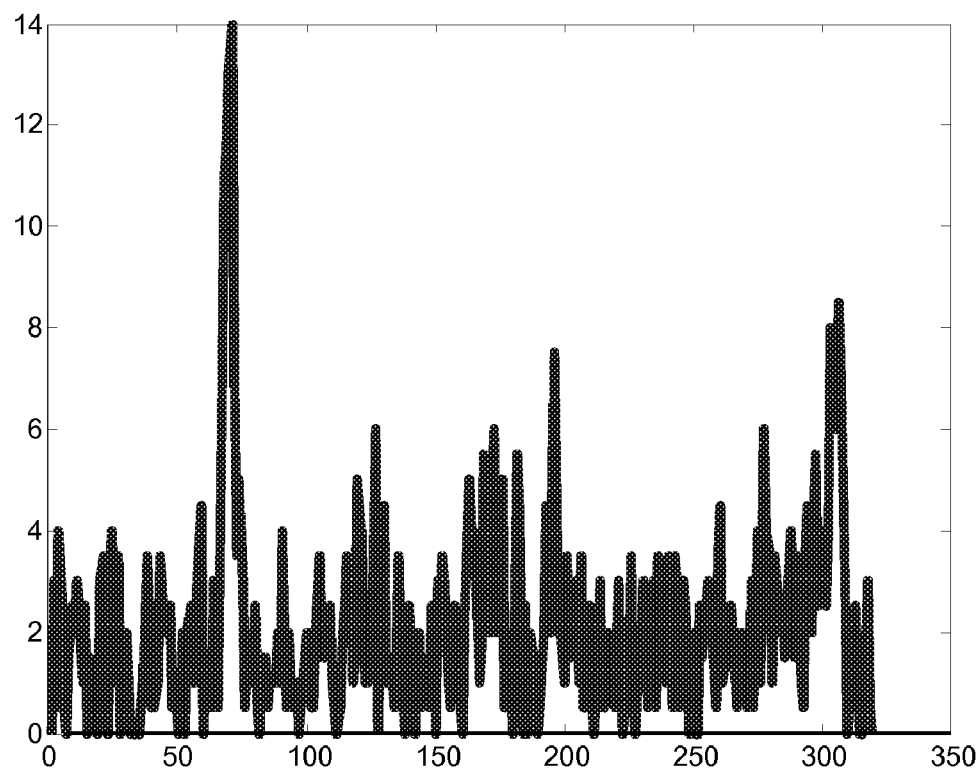
FIG. 6A is a graph showing an exemplary first-layer edge energy feature of the signal shown in FIG. 5A.
Figure 6B:
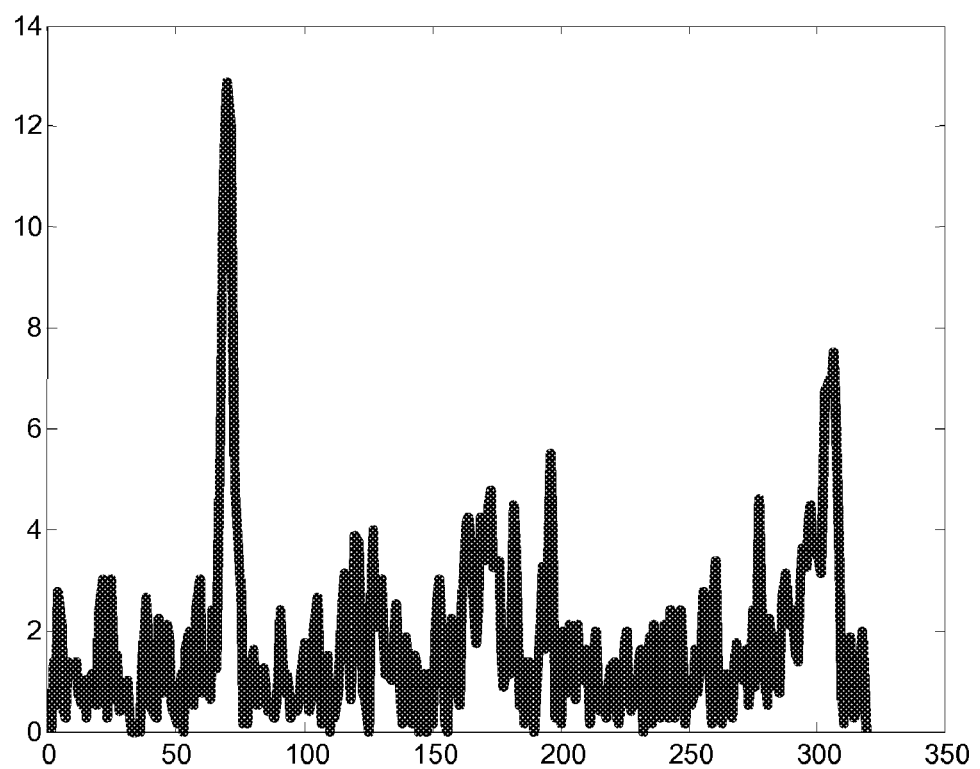
FIG. 6B is a graph showing an exemplary second-layer edge energy feature of the signal shown in FIG. 5A.
Figure 6C:
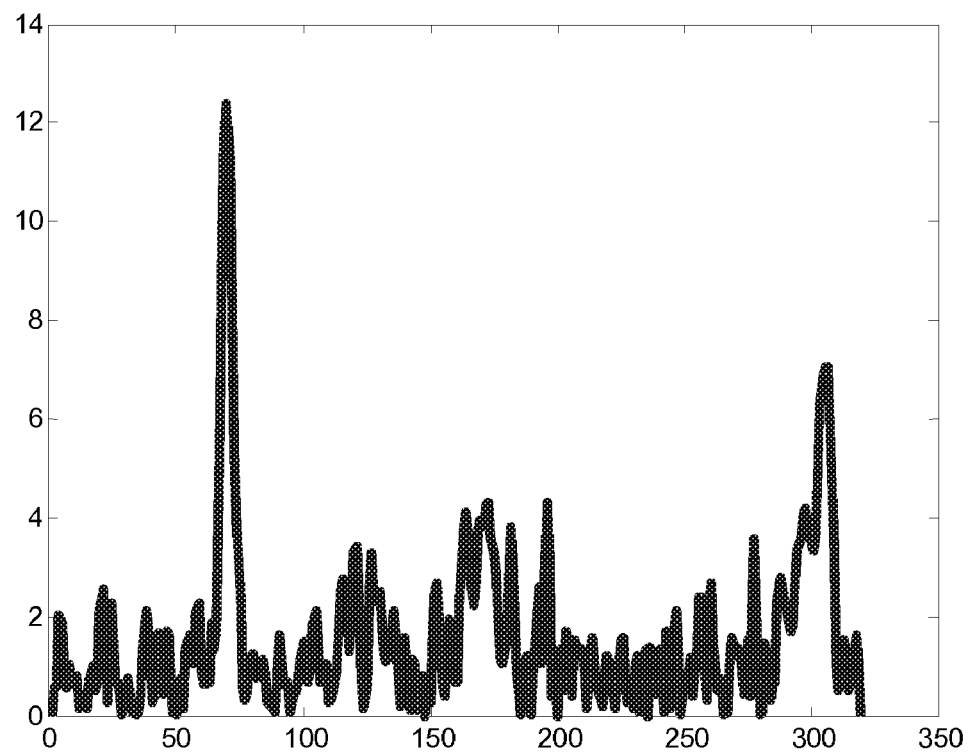
FIG. 6C is a graph showing an exemplary third-layer edge energy feature of the signal shown in FIG. 5A.
Figure 6D:
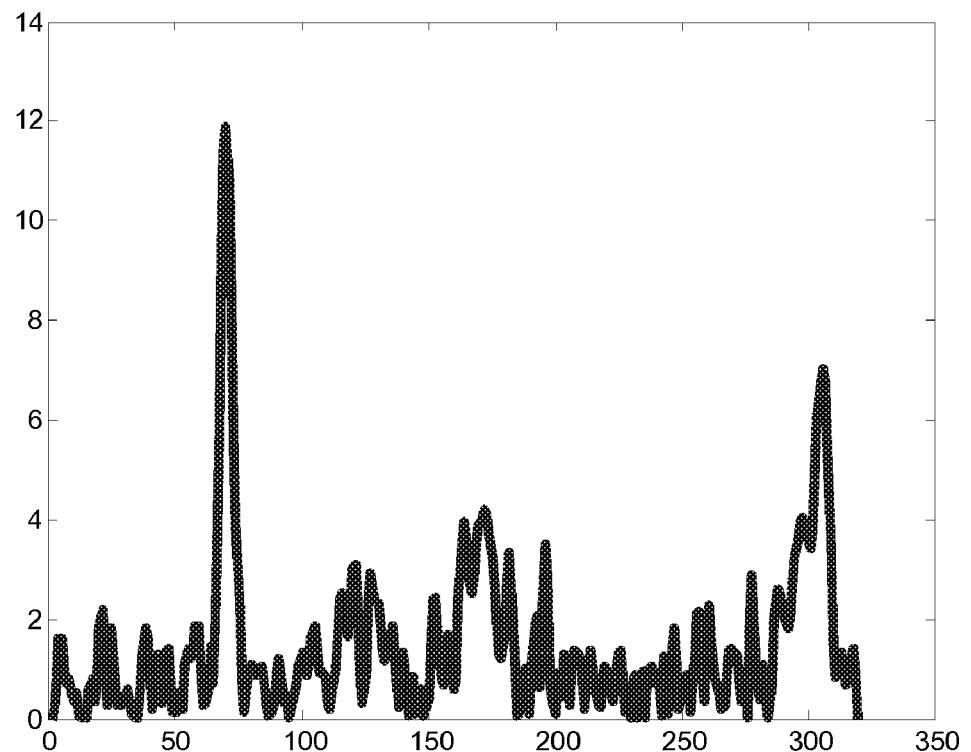
FIG. 6D is a graph showing an exemplary fourth-layer edge energy feature of the signal shown in FIG. 5A.
Figure 7A:
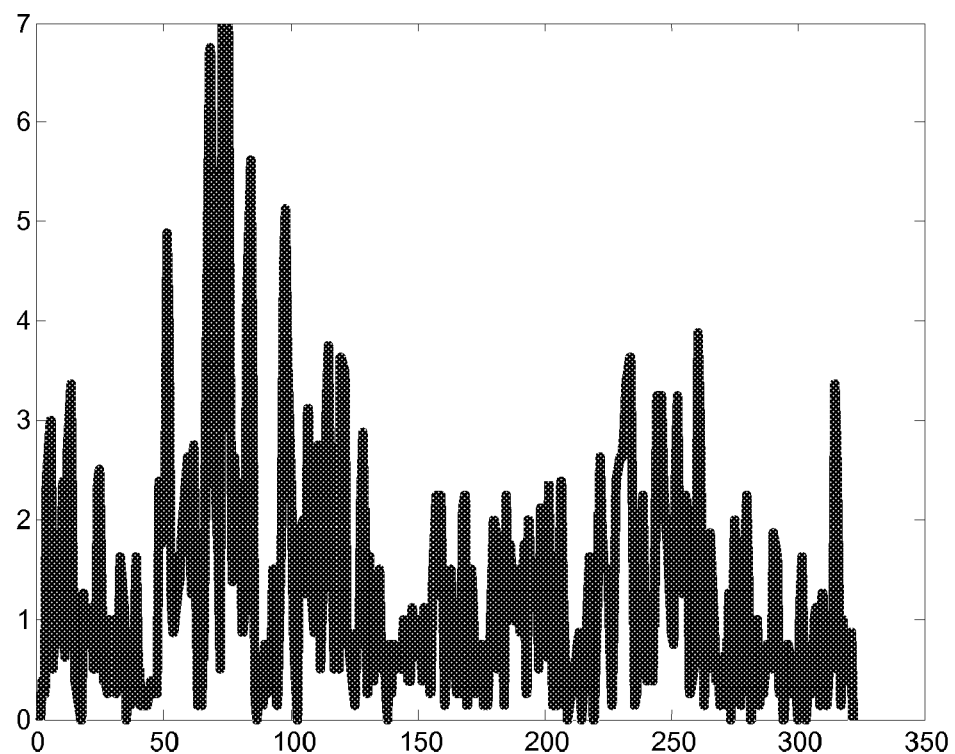
FIG. 7A is a graph showing an exemplary first-layer edge energy feature of the signal shown in FIG. 5B.
Figure 7B:
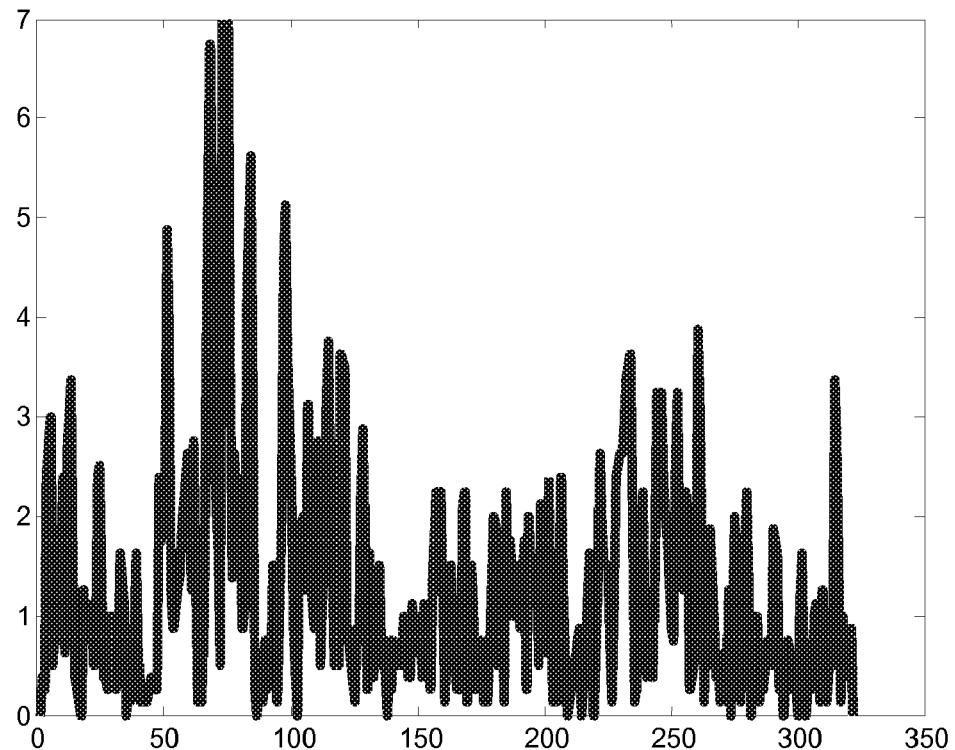
FIG. 7B is a graph showing an exemplary second-layer edge energy feature of the signal shown in FIG. 5B.
Figure 7C:
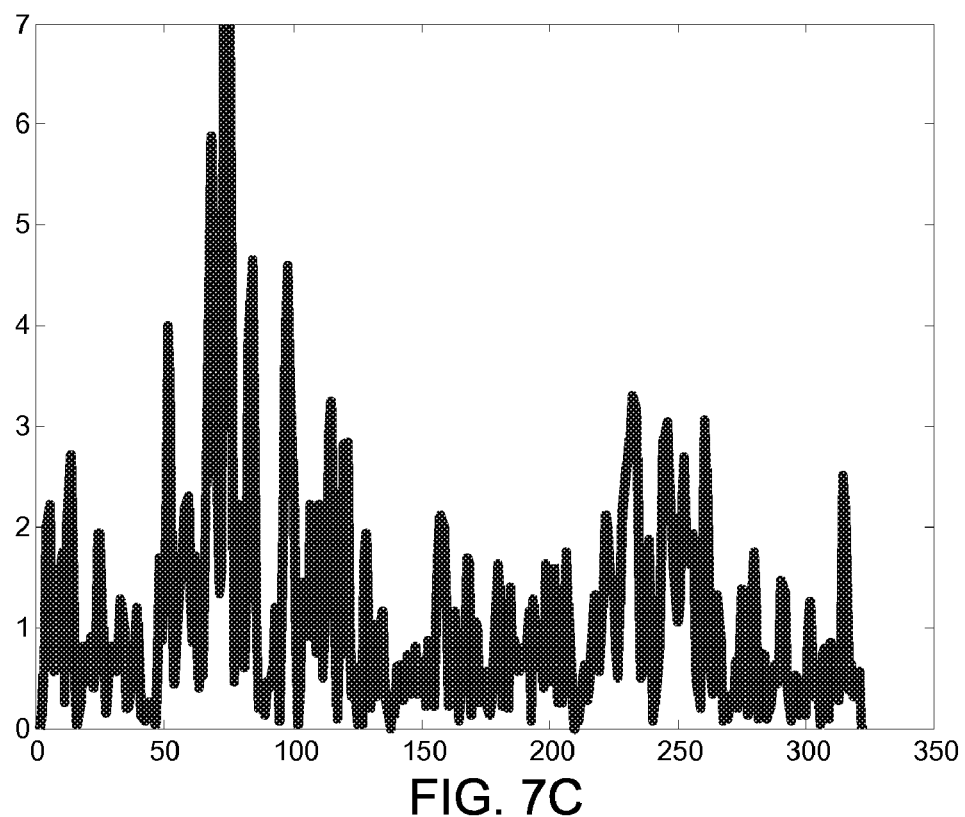
FIG. 7C is a graph showing an exemplary third-layer edge energy feature of the signal shown in FIG. 5B.
Figure 7D:
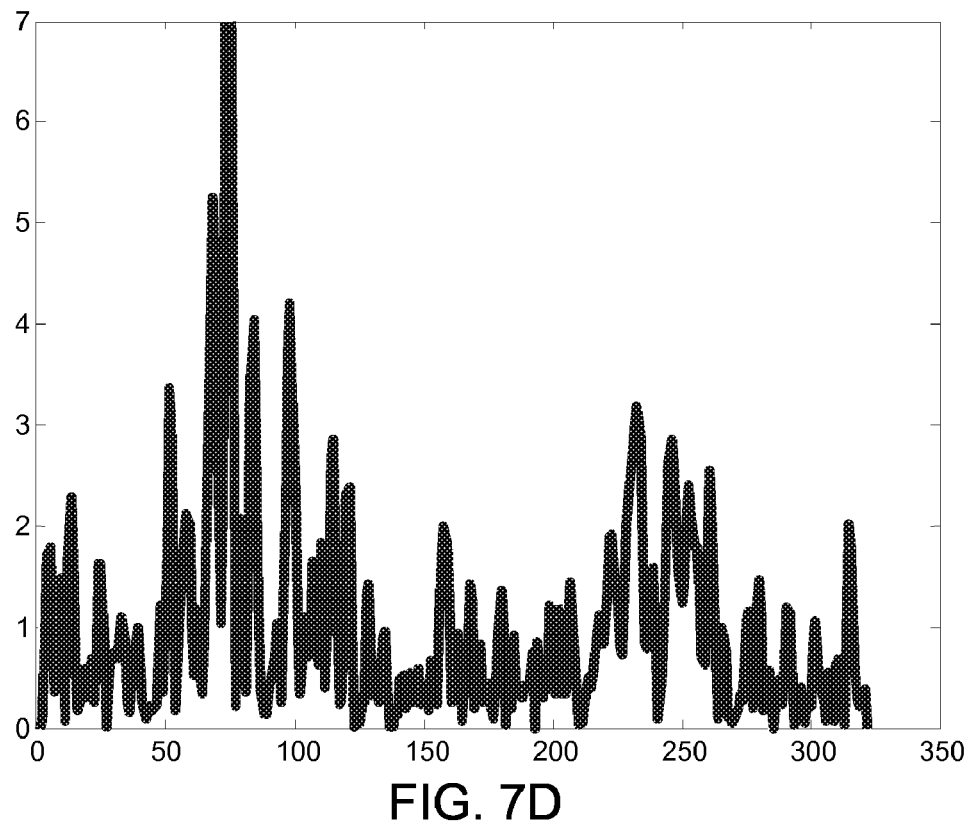
FIG. 7D is a graph showing an exemplary fourth-layer edge energy feature of the signal shown in FIG. 5B.

In some embodiments, the higher level energy features and expressions related thereto may be used to determine an image energy map because the lower-layer energy features may still have too large a noise power to discriminate between noise and edge signal. FIGS. 6A-6D show the edge energy features of the signal shown in FIG. 5A for each successive filtering level. This signal, shown in FIG. 5A, is intended to represent an image profile with characteristic edges. The signal, shown in FIG. 5B is intended to represent an image profile with characteristic fine detail. As shown in FIGS. 6A and 6B, the first two level energy features, $EE_1$ and $EE_2$, for the signal shown in FIG. 5A, may not be very reliable in distinguishing noises from edge signals. Also, using only $EE_4$, shown in FIG. 6D may not allow the ability to include all information of fine texture.

FIGS. 7A-7D show similar edge energy features of each filtration/transform level for the signal shown in FIG. 5B, which is intended to represent a profile of a fine detail region of an image.

Finding Edge Map and Adjusting Threshold Values

Figure 8A:
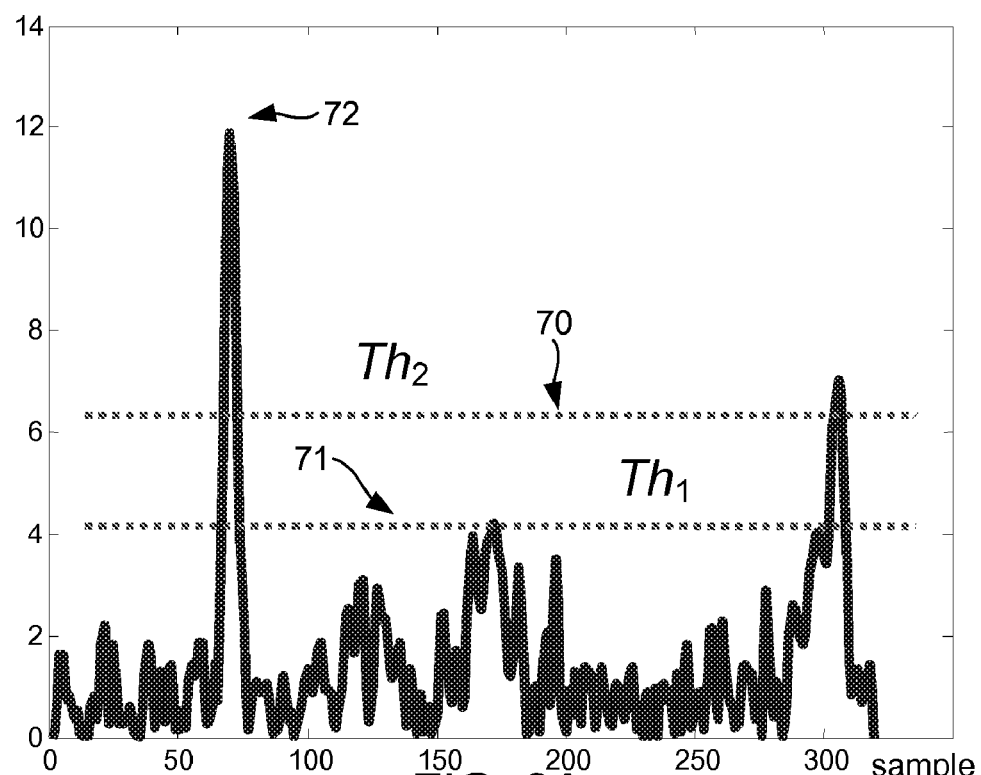
FIG. 8A is a graph showing an exemplary edge energy feature with two threshold values superimposed thereon.
Figure 8B:
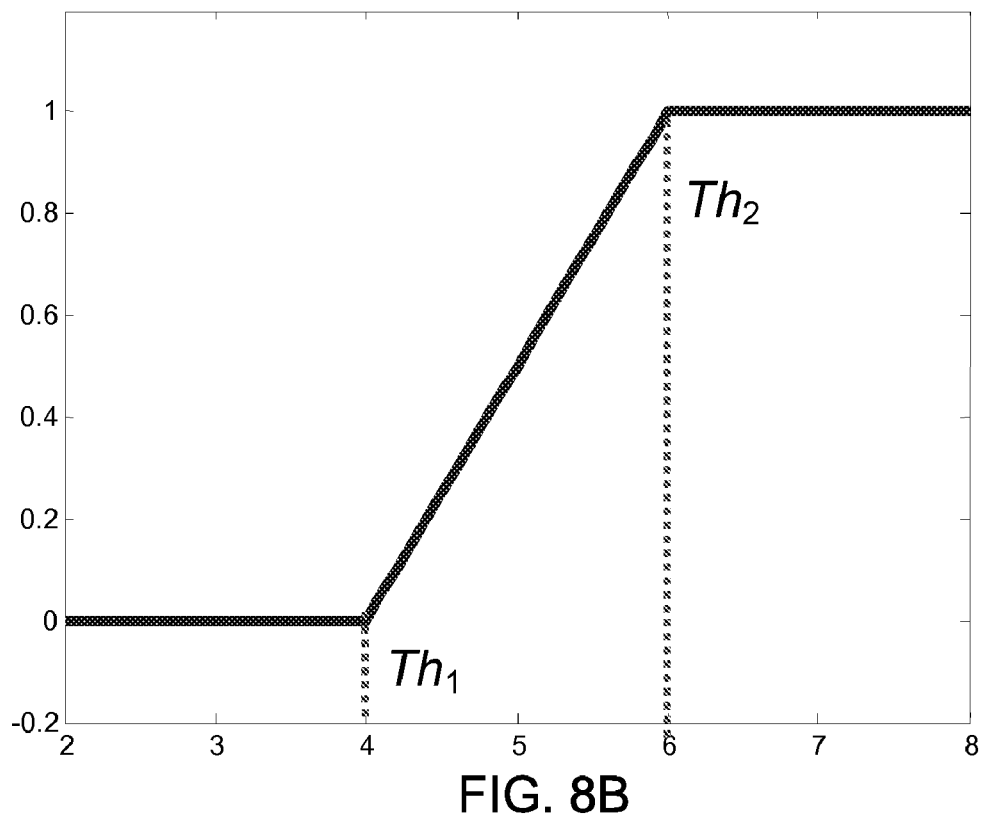
FIG. 8B is a chart showing an exemplary edge map mapping function.

In some embodiments of the present invention, illustrated in FIG. 8, an image edge map may be generated based on the edge energy features of various transform levels of the image. In some embodiments, the method for generating the image edge map may comprise the use of two thresholds 70 and 71 in a soft threshold process. In these embodiments, two threshold values 70 and 71 may be used to avoid discontinuity artifacts in de-noised images. As a result, in these embodiments, the image edge map has real values in the range of [0, 1], where value 0 indicates 100% sure smooth pixel, while value 1 indicates 100% sure edge pixel.

In some embodiments, the image edged map generation process may also comprise the removal of false edge samples. In exemplary embodiments, false edge samples may be isolated and removed by a 5×5 filtering process. In exemplary embodiments, or every edge-like pixel, i.e. the pixel value of edge map is not zero, the filter counts the number of edge-like pixels in 5×5 window. If the number is less than a threshold value, the pixel is considered a non-edge pixel. In an exemplary embodiment, the threshold value may be selected as 5, as this value has yielded good results in experimentation.

In some embodiments of the present invention, noise threshold values may be adjusted by the noise level of a current pixel based on the fact that film grain noise is strongly dependent on background signal intensity. In these embodiments, noise threshold values may be dynamically adjusted pixel-by-pixel. Other dynamic adjustment schemes may also be used.

In some embodiments, a 1D array, Th, may be used to store edge threshold values. The initial threshold values may be pre-determined empirically, the threshold values may then be adjusted to cumulative values through all samples within a frame, a video scene change, or an entire sequence. In some embodiments, threshold values may only be updated in smooth areas based on edge map information, since fine texture areas could give false information. In an exemplary embodiment, if less than 10% of pixels within an 8×8 block are edge pixels, edge threshold values may be updated. An exemplary, detailed decision criterion for two edge threshold values and an associated bin determination are as follows.

$$Th_i[bin]=(1-w)\cdot Th_i[bin]+w\cdot k_i\cdot EE_1 \; i=1,2$$

$$bin=floor(LL_3/Q\_step) \quad (3)$$

where, Q_step=16 in this exemplary embodiment. Weight coefficient, w, may be set to be a small number, e.g., $10^{-4}$, to avoid sudden changes. Coefficient k is a scaling factor to adjust input values. In some embodiments, each input value may represent a mean value of EE and threshold values may be determined by standard deviation.

Some embodiments of the present invention may operate under the assumption that film grain noise has Gaussian distribution. In these embodiments, setting threshold values $k_1=1.1$ and $k_2=1.4$ may result in detection of more than 99% of film grain noises. In some embodiments, to save memory space, a final edge energy map EE may be used instead of $EE_1$ in Eq. 3. In this case, threshold values may be set as using $k_1=2.5$ and $k_2=3$.

Processing Color Images

Some embodiments of the present invention may be used in conjunction with color images. Some of these embodiments may simply apply the methods and systems described above to each color channel. However, a multi-channel system may be too complex and resource intensive. Additionally, some color channels, especially blue channels, can have high noise power. This makes discriminating between noise and edge signal more difficult. Accordingly, some embodiments may use a combined edge map from the combined image instead of using edge maps from separate color channels. Some embodiments may combine the color channels to find a unified edge map. In some embodiments, a principle component analysis may be used to find good coefficient values to derive the combined edge energy. In some embodiments, these coefficient values may be found frame by frame.

Figure 9:
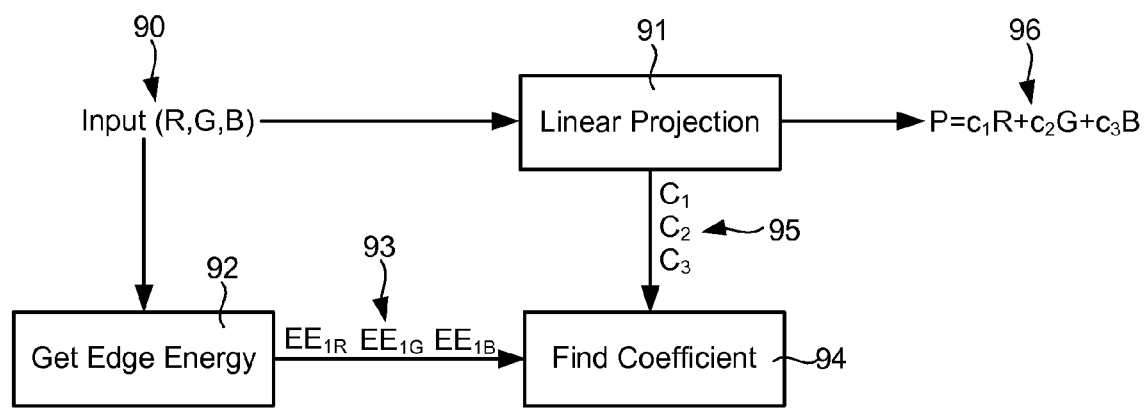
FIG. 9 is chart showing elements of an exemplary combined-image generation

In an exemplary embodiment, illustrated in FIG. 9, the original image 90 may be input to a linear projection process 91 as well as an edge energy determination process 92. The edge energy determination process 92 may generate edge energy feature values 93 for each color channel. The edge energy feature values 93 may then be sent to a coefficient generator 94, such as principle component analysis process. These coefficients 95 may then be combined with the original image in a linear projection process 91 to produce a combined edge map 96.

Computing the Denoised and the Noise Image

In some embodiments, a denoised image may be obtained according to Equation 4, where EM indicates an edge map value in a corresponding pixel and I is the input image value for that pixel.

$$Denoise(i,j)=LL_3(i,j)+EM(i,j)\times[I(i,j)-LL_3(i,j)] \quad (4)$$

In other embodiments, an alternative method may be used to obtain a denoised image. These embodiments may introduce an $LL_1$ layer as a close-edge area. Since the edge map obtained by $EE_3$ and $EE_4$ is smoothed three or four times, the edge area could be broadened. In these embodiments, the $LL_1$ layer may be used in edge areas with interpolation as expressed in Equation 5.

$$\begin{aligned}Denoise &= (1-EM)(LL_3+EM(I-LL_3))+EM(LL_1+ \\ &\quad EM(I-LL_1)) \\ &= LL_3\cdot(1-EM)^2+LL_1\cdot EM(1-EM)+I\cdot EM\end{aligned} \quad (5)$$

Since all these processes are on the pixel-level, the pixel index (i, j) is omitted. These embodiment require additional resources to keep the $LL_1$ layer in memory.

For color input image embodiments, the above process may be applied to each color channel. e.g., R, G & B. However, in some embodiments, the denoised image and the noise image of a red color channel may be obtained through methods expressed in Eqs. 6 and 7 respectively.

$$Denoise_R = LL_{3R} + EM \times (R - LL_{3R})$$

or $$Denoise_R = LL_{3R} \cdot (1-EM)^2 + LL_{1R} \cdot EM(1-EM) + I_R \cdot EM \quad (6)$$

$$Noise_R(i,j) = R(i,j) - Denoise_R(i,j) \quad (7)$$

The methods expressed in Equations 4 and 5 may be used to obtain denoised images for other color channels, e.g., green and blue.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for image noise separation, said method comprising:
   a) processing an original input image to create a first-layer LH filtered image, $LH_1$, which has been low-pass filtered in a first direction and high-pass filtered in a second direction;
   b) processing said input image to create a first-layer HL filtered image, $HL_1$, which has been high-pass filtered in said first direction and low-pass filtered in said second direction;
   c) processing said input image to create a first-layer LL filtered image, $LL_1$, which has been low-pass filtered in said first direction and low-pass filtered in said second direction;
   d) combining said first-layer LH filtered image and said first-layer HL filtered image to produce a first-layer edge energy feature, $EE_1$;
   e) repeating steps b-d using said first-layer LL filtered image as an input image thereby creating a second-layer LH filtered image, $LH_2$, a second-layer HL filtered image, $HL_2$, and a second-layer LL filtered image, $LL_2$;
   f) combining said second-layer LH filtered image and said second-layer HL filtered image to produce a second-layer edge energy feature, $EE_2$;
   g) creating an edge map, EM, from at least one of said edge energy features; and
   h) creating a de-noised image by modifying values in said original input image with values in at least one of said LL filtered images at locations that are not designated as edge areas by said edge map.

2. A method as described in claim 1 further comprising:
   a) repeating steps b-d using said second-layer LL filtered image, $LL_2$, as an input image thereby creating a third-layer LH filtered image, $LH_3$, a third-layer HL filtered image, $HL_3$, and a third-layer LL filtered image, $LL_3$;
   b) repeating steps b-d using said third-layer LL filtered image, $LL_3$, as an input image thereby creating a fourth-layer LH filtered image, $LH_4$, a fourth-layer HL filtered image, $HL_4$, and a fourth-layer LL filtered image, $LL_4$;
   c) combining said third-layer LH filtered image and said third-layer HL filtered image to produce a third-layer edge energy feature, $EE_3$;
   d) combining said fourth-layer LH filtered image and said fourth-layer HL filtered image to produce a fourth-layer edge energy feature, $EE_4$;
   e) creating a combined energy feature by averaging a plurality of said edge energy features; and
   f) wherein said creating an edge map comprises using a two-threshold, soft threshold process on said combined energy feature.

3. A method as described in claim 2 wherein said creating a de-noised image comprises application of the following equation:

$$Denoise(i,j) = LL_3(i,j) + EM(i,j) \times [I(i,j) - LL_3(i,j)].$$

4. A method as described in claim 2 wherein said creating a de-noised image comprises application of the following equation:

$$Denoise = LL_3 \cdot (1-EM)^2 + LL_1 \cdot EM(1-EM) + I \cdot EM.$$

5. A method as described in claim 2 wherein said creating a combined energy feature comprises averaging said $EE_3$ and said $EE_4$.

6. A method for image noise separation, said method comprising:
   a) receiving a color input image;
   b) performing multi-layer decomposition on each color channel of said color input image thereby producing at least one edge energy feature for each color channel and a first-layer low-pass filtered image and a third-layer low-pass filtered image for each color channel;
   c) representing said edge energy features with coefficients;
   d) weighting the color channels of said color input image with said coefficients to produce a combined image;
   e) performing multi-layer decomposition on said combined image to produce at least one combined image edge energy feature and at least one combined image low-pass filtered image;
   f) creating an edge map based on said combined image edge energy feature; and
   g) creating a de-noised color image by modifying values in each color channel of said color input image with values from said low-pass filtered color channel images at locations that are not designated as edge areas by said edge map.

7. A method as described in claim 6 wherein said representing said edge energy features with coefficients comprises a principle component analysis process.

8. A method as described in claim 6 wherein said combined image edge energy is determined by averaging a plurality of edge energy features for different decomposition layers.

9. A method as described in claim 6 wherein said combined image edge energy is determined by averaging a third-layer edge energy feature and a fourth-layer edge energy feature for said combined image.

10. A method as described in claim 6 wherein said performing multi-layer decomposition on said combined image produces a third-layer combined-image low-pass filtered image.

11. A method as described in claim 6 wherein said creating an edge map comprises using a two-threshold, soft threshold process on said combined image edge energy feature.

12. A method as described in claim 6 wherein said creating a de-noised color image comprises application of the following equation for each color channel:

$$Denoise(i,j) = LL_3(i,j) + EM(i,j) \times [I(i,j) - LL_3(i,j)]$$

wherein I represents an input image value, EM represent edge map values and $LL_3$ represents a third-layer, combined-image, low-pass filtered image value.

13. A method as described in claim 6 wherein said creating a de-noised color image comprises application of the following equation for each color channel:

$$\text{Denoise} = LL_3 \cdot (1-EM)^2 + LL_1 \cdot EM(1-EM) + I \cdot EM$$

wherein I represents an input image value, EM represent edge map values, $LL_3$ represents a third-layer, combined-image, low-pass filtered image value and, $LL_1$ represents a first-layer, combined-image, low-pass filtered image value.

14. A method as described in claim 6 further comprising creating a noise image.

15. A system for image noise separation, said method comprising:
  a) a color-channel multi-layer filter processor for performing multi-layer decomposition on each color channel of a color input image thereby producing at least one edge energy feature for each color channel, a first-layer low-pass filtered image and a third-layer low-pass filtered image for each color channel of said color input image;
  b) a coefficient generator for representing said edge energy features with coefficients;
  c) a linear projection processor for weighting the color channels of said color input image with said coefficients to produce a combined image;
  d) a combined-image, multi-layer filter processor for performing multi-layer decomposition on said combined image to produce at least one combined image edge energy feature and at least one combined image low-pass filtered image;
  e) an edge map processor for creating an edge map based on said combined image edge energy feature; and
  f) a de-noise processor for creating a de-noised color image by modifying values in each color channel of said color input image with values from said low-pass filtered color channel images at locations that are not designated as edge areas by said edge map.

16. A system as described in claim 15 wherein said coefficient generator for representing said edge energy features with coefficients uses a principle component analysis process.

17. A method as described in claim 15 wherein combined-image, multi-layer filter processor averages a third-layer edge energy feature and a fourth-layer edge energy feature to determine said combined image edge energy feature.

18. A method as described in claim 15 wherein said combined-image, multi-layer filter processor for performing multi-layer decomposition on said combined image produces a third-layer, combined-image, low-pass filtered image.

19. A method as described in claim 15 wherein said edge map processor for creating an edge map uses a two-threshold, soft threshold process on said combined image edge energy feature.

20. A method as described in claim 15 wherein said de-noise processor for creating a de-noised color image applies the following equation for each color channel:

$$\text{Denoise} = LL_3 \cdot (1-EM)^2 + LL_1 \cdot EM(1-EM) + I \cdot EM$$

wherein I represents an input image value, EM represent edge map values, $LL_3$ represents a third-layer, combined-image, low-pass filtered image value and, $LL_1$ represents a first-layer, combined-image, low-pass filtered image value.

* * * * *